United States Patent
Murata et al.

[11] Patent Number: 5,695,032
[45] Date of Patent: Dec. 9, 1997

[54] HYDRAULIC CLUTCH SYSTEM WITH FLYWHEEL

[75] Inventors: Kiyohito Murata; Hiroyuki Shioiri; Shogo Matsumoto, all of Susono, Japan

[73] Assignee: Toyota Jidosha Kabushiki Kaisha, Toyota, Japan

[21] Appl. No.: 693,797

[22] Filed: Jul. 31, 1996

[30] Foreign Application Priority Data

Aug. 10, 1995 [JP] Japan .................... 7-204659
Oct. 19, 1995 [JP] Japan .................... 7-2171586

[51] Int. Cl.$^6$ .................. F16D 3/10; F16D 3/14; F16D 21/08
[52] U.S. Cl. .................. 192/48.1; 192/87.1; 192/213.1; 74/574; 464/46; 464/68
[58] Field of Search .................. 192/48.1, 48.7, 192/70.17, 70.18, 70.19, 70.21, 87.1, 87.16, 213.1, 213.11, 3.25, 3.26; 74/573 F, 574; 464/46, 66, 68

[56] References Cited

U.S. PATENT DOCUMENTS

| | | | |
|---|---|---|---|
| 4,724,524 | 2/1988 | Nakane | 192/48.3 |
| 4,724,719 | 2/1988 | Werner et al. | 464/68 X |
| 4,790,419 | 12/1988 | Loizeau | 74/574 X |
| 4,842,116 | 6/1989 | Fukushima | 74/574 X |
| 4,842,117 | 6/1989 | Fukushima | 74/574 |
| 4,844,224 | 7/1989 | Fukushima | 74/574 X |
| 4,846,323 | 7/1989 | Fukushima | 74/574 X |
| 5,176,233 | 1/1993 | Woerner et al. | 192/48.1 |
| 5,348,127 | 9/1994 | Murata et al. | |

FOREIGN PATENT DOCUMENTS

| | | |
|---|---|---|
| 2-17231 | 5/1990 | Japan . |
| 2-20520 | 6/1990 | Japan . |
| 4-231754 | 8/1992 | Japan . |
| 4-351326 | 12/1992 | Japan . |
| 5-209667 | 8/1993 | Japan . |

*Primary Examiner*—Andrea L. Pitts
*Attorney, Agent, or Firm*—Oblon, Spivak, McClelland, Maier & Neustadt, P.C.

[57] ABSTRACT

A flywheel (FW) includes a front cover as a first mass member (102), an inner plate as a second mass member (104), and a coiled spring as a damper member (106) which is interposed between the first and second mass members. A clutch or a clutch body (108) is disposed so as to be connectible with and disconnectible from the inner plate (104) by hydraulic pressures (P0, P1). The front cover (102) and the inner plate (104) are united through a friction plate as coupling means (110) by the hydraulic pressures (P0, P1) for connecting and disconnecting the clutch (108). Thus, the first and second mass members (102, 104) can be united by the simple construction of low cost. Furthermore the uniting operation, inclusive of its synchronization with the control of the clutch body (108), can be precisely controlled.

6 Claims, 7 Drawing Sheets

HYDRAULIC CLUTCH SYSTEM WITH FLYWHEEL

BACKGROUND OF THE INVENTION

1. Field of the Invention

The present invention belongs to a technical field which relates to a hydraulic clutch system with a flywheel. More particularly, it pertains to a hydraulic clutch system with a flywheel which is well suited for application to, for example, the engine starting clutch of a motor vehicle.

2. Description of the Prior Art

By way of example, a hydraulic clutch system with a flywheel for use in a motor vehicle as schematically shown in FIG. 7 has hitherto been disclosed in the official gazette of Japanese Patent Application Laid-open No. 351326/1992.

The hydraulic clutch system has a flywheel 8 which includes a first mass (or weight) member 2, a second mass (or weight) member 4, and a spring (a damper member) 6 interposed between the mass members 2 and 4, and a clutch body 10 which is disposed so as to be hydraulically connectible with and disconnectible from the second mass member 4.

The first mass member 2 is connected with an engine 12. The clutch body 10 is connected to an output shaft 16 (as the input shaft of an automatic transmission) through a second damper member 14.

In this manner, the flywheel 8 is split into the first and second mass members 2 and 4. Thus, fluctuation in a torque delivered from the engine 12 can be absorbed more favorably so as to prevent the torque fluctuation from being transmitted to the side of the clutch body 10.

Herein, when the flywheel 8 is split into the two mass members 2 and 4 in this way, a new resonance appears in the low-speed revolution region (200~500 r.p.m.) of the engine 12. Since the revolution speed of this region is lower than an idling revolution speed in the ordinary use of the motor vehicle, the resonance in this region does not especially pose a problem during the general drive of the motor vehicle.

However, in a case, for example, where the revolution speed of the engine has lowered down into the specified region from any cause or where the engine 12 is to be started, there occurs such a drawback that the body of the motor vehicle vibrates due to the resonance in this region or that the engine fails to be favorably started due to the absorption of energy based on the resonance.

In order to eliminate the drawback, for example, the official gazette of Japanese Patent Application Laid-open No. 231754/1992 or Japanese Utility Model Registration Application Publication No. 20520/1990 has proposed a technique wherein the resonance in the low-speed speed revolution region is suppressed by adding a frictional material or a viscous material to the damper members.

Besides, the official gazette of Japanese Utility Model Registration Application Publication No. 17231/1990 has proposed a technique wherein the first and second mass members 2 and 4 stated before are respectively furnished with electromagnets and wherein the resonance in the low-speed revolution region is suppressed by controlling the electromagnets.

However, the technique of the type wherein the frictional material or the viscous material is added as disclosed in the official gazette of Japanese Patent Application Laid-open No. 231754/1992 or Japanese Utility Model Registration Application Publication No. 20520/1990, has the problem that a vibration absorbing capability in the region except the point of the resonance degrades due to an afforded friction or viscosity. A further problem is that, regarding the time at which, and the extent to which the resonance is suppressed, the technique of the type cannot realize an exact (or precise) control or an arbitrary control.

With the technique of the type wherein the electromagnets are mounted on the first and second mass members and are controlled for the suppression of the resonance as disclosed in the official gazette of Japanese Utility Model Registration Application Publication No. 17231/1990, a free control is possible regarding the time at which the resonance is suppressed. By way of example, the timing of the suppression or non-suppression of the resonance can be comparatively exactly synchronized with that of the connection or disconnection of the clutch body. This technique, however, has the problem that the electromagnets, a control unit for controlling them, etc. must be separately prepared, so the whole system increases in cost and enlarges in size inevitably.

SUMMARY OF THE INVENTION

The present invention has been made in view of the problems of the prior art as stated above, and has for its object to provide a hydraulic clutch system with a flywheel in which any resonance in the low-speed revolution region of an engine can be controlled at high accuracies regarding the timing and extent of the suppression of the resonance by a simple construction of low cost.

The present invention has achieved the above object by a hydraulic clutch system with a flywheel, wherein the flywheel includes a first mass member, a second mass member, and a damper member which is interposed between the first and second mass members, and wherein a clutch body is disposed so as to be hydraulically connectible with and disconnectible from the second mass member; the system comprising coupling means for uniting the first mass member and the second mass member by hydraulic pressures which function to connect and disconnect the clutch body (as defined in Claim 1).

That is, in the present invention, the first mass member and the second mass member are united by the hydraulic pressures for connecting and disconnecting the clutch body. Therefore, it is very easily permitted to synchronize the timing of the suppression or non-suppression of the resonance with that of the connection or disconnection of the clutch body, or to control the extent of the suppression as desired. Moreover, in that case, any new control unit or the like is not especially required.

In the hydraulic clutch system according to Claim 1, said coupling means for uniting the first mass member and the second mass member can be furnished with auxiliary coupling means for generating a coupling force which prevents the first mass member and the second mass member from rotating relatively to each other, even in a state where the hydraulic pressures for connecting and disconnecting the clutch body have not developed yet (as defined in Claim 2). In this case, even in such a state where the engine is revolving only at a low speed, and hence, a clutch oil pressure for the clutch body has not sufficiently risen yet, the damper action of the damper member can be restricted in order that the first and second mass members may function as a single mass member. Therefore, the resonance can be suppressed.

Incidentally, when the clutch oil pressure has risen to apply a clutch (that is, to bring the clutch body into engagement), the first and second mass members can be reliably separated by this clutch oil pressure in synchronism with the engagement of the clutch body.

The hydraulic clutch system according to Claim 2 can be so constructed as to further comprise friction means for generating a frictional force when the clutch body has been connected by the urging force of the auxiliary coupling means (as defined in Claim 3). In this case, the vibration of a motor vehicle attributed to, e.g., a jerk at the rapid start thereof can be suppressed, and the auxiliary coupling means can be utilized more effectively.

Besides, the hydraulic clutch system according to Claim 2 can be furnished with engagement means which engages first and second retention plates which retain the auxiliary coupling means. The engagement means allow the first and second retention plates to move in an axial direction thereof and unite them in a rotary direction thereof (as defined in Claim 4). In this case, it is permitted to effectively prevent any torsional force in the rotary direction from acting on the auxiliary coupling means through the retention plates. As a result, the accuracy of the urging force of the auxiliary coupling means can be stably kept at all times.

In the hydraulic clutch system according to Claim 1, the clutch body can be furnished with an auxiliary clutch body which makes it possible to transmit a predetermined magnitude of power, till the hydraulic pressures can bring the clutch body into engagement (as defined in Claim 5). In this case, even in the low-speed revolution state of the engine where the clutch oil pressure has not sufficiently risen yet, and hence, the clutch body has not been connected yet, a predetermined load can be afforded to the engine, and an abnormal rise in engine rotational speed can be effectively restrained.

Besides, the hydraulic clutch system according to Claim 1 can have a construction wherein a second damper member which is separate from the first-mentioned damper member is arranged on a driven side of the clutch body, and a spring constant of the second damper member is set greater than that of the first-mentioned damper member (as defined in Claim 6). In this case, owing to the presence of the second damper member, the function of absorbing the vibration at the engagement of the clutch body can be enhanced more. Further, since the spring constant of the second damper member is greater, energy to be stored in the second damper member can be rendered less than in the first damper member which is arranged on the drive side of the clutch body. As a result, a shock, which is ascribable to the fact that the energy stored in the second damper member is emitted when the clutch body has been disconnected, can be suppressed to a satisfactorily low level.

BRIEF DESCRIPTION OF THE DRAWINGS

The above and other objects, features and advantages of the present invention will become more apparent from the following description of the invention taken in conjunction with the accompanying drawings, wherein like reference characters designate the same or similar parts, and wherein.

DETAILED DESCRIPTION OF THE PREFERRED EMBODIMENTS

Now, examples of the more practicable aspects of performance (embodiment) of the present invention will be described in detail with reference to the drawings.

Figure 1:
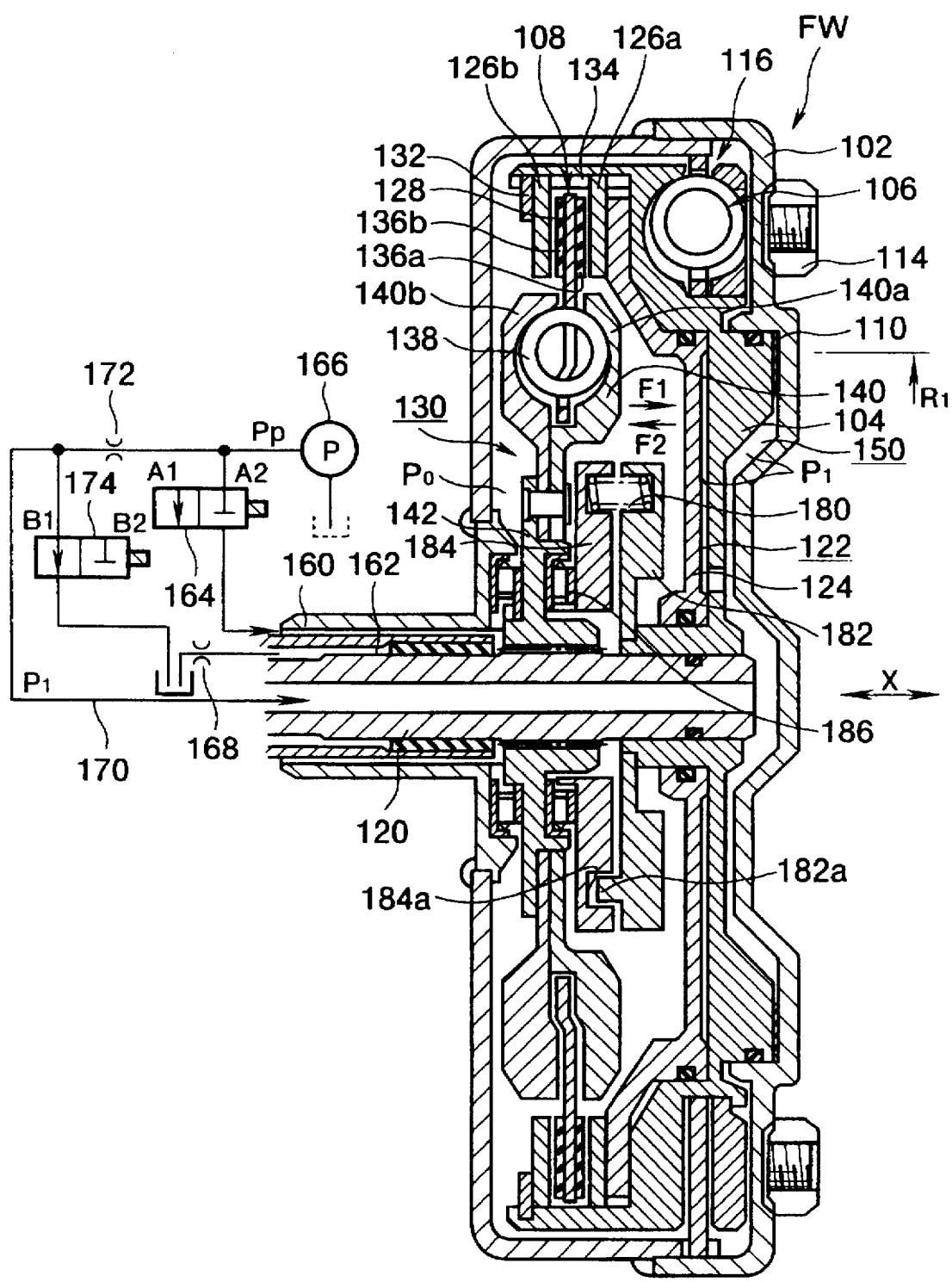
FIG. 1 is a vertical sectional view of a hydraulic clutch system with a flywheel, as well as a hydraulic circuit included as a part thereof, showing the first aspect of performance of the present invention.

FIG. 1 illustrates a hydraulic clutch system with a flywheel according to the first aspect of performance of the present invention.

The hydraulic clutch system includes the flywheel FW and a clutch (or a clutch body) 108. The flywheel FW is chiefly constructed of a front cover (as a first mass or weight member) 102, an inner plate (as a second mass or weight member) 104, and a coiled spring (as a damper member) 106 interposed between the front cover 102 and the inner plate 104. The clutch 108 is disposed so as to be connectible with and disconnectible from the inner plate 104 by hydraulic pressures P0 and P1. This hydraulic clutch system further includes a friction plate (as coupling means) 110 which unites the front cover 102 and the inner plate 104 by the hydraulic pressures P0 and P1 which function as pressures to connect and disconnect the clutch 108.

The individual members will be detailed below.

The front cover (as the first mass member) 102 is joined with a drive plate on the side of an engine not shown, through a nut 114. The coiled spring (as the damper member) 106 is joined with the front cover 102 through an engagement portion 116 so as to be rotatable unitarily therewith. This coiled spring 106 is also joined with the inner plate (as the second mass member) 104 so as to be rotatable unitarily therewith.

The clutch (or the clutch body) 108 is free to be engaged with, or released from the inner plate 104. Owing to this clutch 108, power transmitted through the front cover 102 from the engine side is delivered to the side of an output shaft 120 (as the input shaft of an automatic transmission) or is cut off.

The clutch 108 is chiefly constructed of a piston chamber 122, a piston 124, a pair of pressure plates 126a and 126b, and a disc 128 which is arranged between the pair of pressure plates 126a and 126b.

The piston 124 is slidable in the axial direction X of the hydraulic clutch system in accordance with the differential pressure (P1–P0) between the hydraulic pressure P1 introduced into the piston chamber 122 (defined on one side of this piston 124) and the hydraulic pressure P0 introduced into a space 130 (defined on the other side thereof). The pair of pressure plates 126a and 126b are restricted in their movements in the axial direction X by a stop ring 132. Therefore, when these pressure plates 126a and 126b have one side thereof pressed by the piston 124, they intensely sandwich the interposed disc 128 therebetween. In contrast, when they are released from the press of the piston 124, they separate from the disc 128. Friction plates 136a and 136b are stuck on the disc 128. Thus, the delivery and cutoff of the power transmitted from the engine side are respectively realized by the operation of the pressure plates 126a and 126b sandwiching the disc 128 therebetween and the operation thereof separating from the disc 128.

The disc 128 of the clutch 108 on the driven side of this clutch (on the side opposite to the engine) is joined with a second coiled spring (as a second damper member) 138. The second coiled spring 138 is joined with the output shaft 120 (as the input shaft of the automatic transmission) through keep members 140a and 140b as well as a hub 142.

The spring constant K2 of the second coiled spring (as the second damper member) 138 is set greater than that K1 of the aforecited coiled spring (as the damper member) 106. Accordingly, energy to be stored in the second coiled spring 138 is less than energy to be stored in the coiled spring 106.

Meanwhile, a piston chamber 150 into which the hydraulic pressure P1 is introduced is formed between the front cover 102 and the inner plate 104. In addition, the inner plate 104 is movable along the output shaft 120. The friction plate (as the coupling means) 110 is stuck on the part of the inner plate 104 closer to the front cover 102. Thus, the front cover 102 and the inner plate 104 can be joined through the friction plate 110 by the movement of this inner plate 104 in the axial direction X.

By the way, in this aspect of performance, the engagement faces of the friction plate 110 and the front cover 102 are flattened in order to control the engagement state of both in various aspects including a slip control. As will be explained later, however, the engagement faces may well be formed in specified shapes so that both the constituents 110 and 102 can be favorably united even by a smaller urging force.

A feed oil passage 160 and a drain oil passage 162 are led to the space 130. The feed oil passage 160 is supplied with the oil of an oil pump 166 through a switching solenoid 164. Besides, an orifice 168 is arranged in the drain oil passage 162. Thus, the predetermined hydraulic pressure P0 can be generated in the space 130.

On the other hand, an oil passage 170 is led to the piston chambers 122 and 150. An orifice 172 and a pressure regulating solenoid 174 are arranged in the oil passage 170. Owing to the functions of the orifice 172 and the pressure regulating solenoid 174, the original pressure Pp of the oil pump 166 is regulated to the hydraulic pressure P1, which is introduced into the piston chambers 122 and 150 through the oil passage 170.

If necessary, the pressure regulating solenoid 174 is rapidly switched to its B1-side and B2-side indicated in the figure, in accordance with a predetermined duty ratio, whereby any desired hydraulic pressure P1 is established. This makes it possible to control the transient characteristics of the clutch 108 at the engagement thereof or to intentionally slip-control the clutch 108. Further, when the switching solenoid 164 is a duty valve, a linear valve or the like, which is endowed with the variable orifice function, the hydraulic pressures P0 and P1 themselves and the differential pressure thereof can be exactly prepared at a very high versatility. It is accordingly possible to control the coupling-degree of the friction plate 110, the slip-degree for the clutch 108, etc. at higher accuracies.

Besides, numeral 180 in the figure indicates a coiled spring (as auxiliary coupling means). The coiled spring 180 serves to generate on the friction plate 110 a coupling force Fs which prevents the front cover 102 and the inner plate 104 from rotating relatively to each other, even in a state where the hydraulic pressures P0 and P1 have not developed yet as at the start of the engine. Accordingly, this coiled spring 180 is not always indispensable. It need not be of coiled spring type, either. By way of example, it may well be of belleville spring type as in the aspect of performance illustrated in FIG. 3.

The coiled spring (as the auxiliary coupling means) 180 is retained by first and second retention plates 182 and 184 in the aspect of performance illustrated in FIG. 1. The first retention plate 182 is fixed to the inner plate 104. The second retention plate 184 is attached to the hub 142 through a needle bearing 186.

The first and second retention plates 182 and 184 are respectively furnished with engagement means 182a and 184a adapted to engage each other. Owing to the engagement means 182a and 184a, the first and second retention plates 182 and 184 are allowed to move in the axial direction thereof and are united in the rotary direction thereof. As a result, any torsional force transmitted through the first and second retention members 182 and 184 does not act on the coiled spring 180 at all. Accordingly, the predetermined urging force of the coiled spring 180 can be stably produced anytime.

Next, the operation of the first aspect of performance will be explained.

[Release of Clutch 108]

During a period of the start of the engine, or on an occasion where the revolution speed of the engine has lowered to a predetermined value, the clutch 108 is held in or brought into the released state by the hydraulic pressures P0 and P1. In addition, the front cover (as the first mass member) 102 and the inner plate (as the second mass member) 104 are coupled through the friction plate (as the coupling means) 110 by the identical hydraulic pressures P0 and P1.

This situation will be stated in more detail below.

When the clutch 108 is to be released, the switching solenoid 164 is changed-over to its A1-side indicated in FIG. 1. Thus, the feed oil passage 160 is supplied with the oil of the oil pump 166, and the hydraulic pressure P0 being high is generated in the space 130. Besides, the pressure regulating solenoid 174 is maintained on its B1-side indicated in the figure, and the hydraulic pressure P1 being close to zero (being very low) is generated in the piston chambers 122 and 150. As a result, the hydraulic pressure difference (P0– P1) develops between both sides of the piston 124 of the clutch 108 as viewed in the axial direction X. Therefore, the piston 124 is moved rightwards as viewed in the figure, and the pressure plates 126a and 126b are separated from the disc 128. Consequently, the clutch 108 is released.

Meantime, owing to the hydraulic pressure difference (P0>P1) which develops between the left side of the piston 124 and the right side of the inner plate 104 as viewed in the figure, the piston 124 and inner plate 104 are unitarily moved rightwards as viewed in the figure. Then the friction plate (as the coupling means) 110 stuck on the inner plate 104 is intensely pressed against the front cover 102. As a result, the inner plate 104 is united with the front cover 102. That is, the front cover (as the first mass member) 102 and the inner plate (as the second mass member) 104 are united through the friction plate (as the coupling means) 110 by the hydraulic pressures P0 and P1 for releasing the clutch (or the clutch body) 108.

As stated before, in uniting the front cover 102 and the inner plate 104, the urging force Fs of the coiled spring (as the auxiliary coupling means) 180 acts conjointly. Therefore, even in the state where the hydraulic pressure P0 (and P1) has hardly been generated, e. g., immediately after the start of the engine, and hence, the differential pressure (P0–P1) is almost zero, the friction plate 110 can maintain a predetermined transmitted torque. Thus, while the clutch 108 is released, the front cover 102 and inner plate 104 can be kept united to the degree in which they are prevented from rotating relatively to each other. Besides, even in a state where the front cover 102 and inner plate 104 cannot be perfectly united, the frictional plate 110 can afford a frictional force for obtaining a sufficient attenuating force.

As a result, especially in an engine starting mode, etc., any resonance appearing in the low-speed revolution region (for example, 200–500 r.p.m.) of the engine can be reliably suppressed, and the operation of the engine can be favorably started.

Incidentally, since the first and second retention plates 182 and 184 for the coiled spring 180 are respectively furnished with the engagement means 182a and 184a, the plates 182 and 184 can be reliably prevented from rotating relatively to each other even in the released state of the clutch 108. More specifically, both the retention plates 182 and 184 are united and are rotated together with the inner plate 104, and their rotations relative to the hub 142 are absorbed by the needle bearing 186.

Further, since the spring constant K2 of the second coiled spring (as the second damper member) 138 is set greater than the constant K1 of the coiled spring (as the damper member) 106, a very large amount of energy is not stored in the second coiled spring 138. Accordingly, when the clutch 108 is to be released, a shock, which is ascribable to the emission of the energy stored in the second coiled spring 138, can be suppressed to a feeble one.

[Engagement of Clutch 108]

The clutch 108 is engaged in the following way by the hydraulic pressures P0 and P1. On this occasion, the friction plate (as the coupling means) 110 is separated from the front cover 102 by the hydraulic pressures P0 and P1 (for engaging the clutch 108), so that the front cover 102 and the inner plate 104 are transferred from the unitary state thereof into the state in which they are joined through the coiled spring (as the damper member) 106.

This situation will be stated in more detail below.

When the clutch 108 is to be engaged, the switching solenoid 164 is changed-over to an A2-state indicated in FIG. 1. Thus, the supply of the oil to the feed oil passage 160 is blocked, and the hydraulic pressure P0 within the space 130 is lowered near to zero (in other words, the oil within the space 130 is drained) Incidentally, in the case where the orifice 168 of the drain oil passage 162 is a variable-capacity orifice, the oil of the hydraulic pressure P0 can be drained more quickly by letting this orifice 168 fully open. Anyway, the oil of the hydraulic pressure P0 within the space 130 is drained near to zero by changing-over the switching solenoid 164 to the A2-side indicated in the figure.

On the other hand, the pressure regulating solenoid 174 is maintained on the B2-side indicated in the figure, and the hydraulic pressure P1 being high is supplied into the piston chambers 122 and 150 through the oil passage 170.

In this way, the hydraulic pressure P0 supplied into the space 130 is approximately zero, and the hydraulic pressure P1 supplied into the piston chambers 122 and 150 is higher than the hydraulic pressure P0, so that the hydraulic pressure difference (P1–P0) develops between on both the sides of the piston 124 of the clutch 108. Since the inner plate 104 and the stop ring 132 are united, the axial distance between them is invariable. Therefore, the piston 124 is moved leftwards as viewed in FIG. 1, by the hydraulic pressure difference (P1–P0). Thus, the pressure plates 126a and 126b undergo a reaction force from the stop ring 132 and sandwich the disc 128 therebetween intensely. As a result, the clutch 108 is engaged.

Meanwhile, the (high) hydraulic pressure P1 introduced into the piston chamber 122 generates a force for axially separating the inner plate 104 and the piston 124, but the separating force is received by the stop ring 132. Accordingly, although the hydraulic pressure P1 introduced into the piston chamber 122 contributes to the engagement of the piston 124, the pressure P1 does not contribute at all to the axial positioning of the inner plate 104 and piston 124 as a whole.

Further, the high hydraulic pressure P1 acts on the right side of the inner plate 104 as viewed in FIG. 1, whereas the low hydraulic pressure P0 acts on the left side of the piston 124 as viewed in the figure. Accordingly, (when a force based on the resulting hydraulic pressure difference is greater than the urging force Fs of the spring 180,) the inner plate 104 and piston 124 as the whole are moved leftwards as viewed in the figure. In consequence, the friction plate 110 is separated from the front cover 102, so that the front cover 102 and the inner plate 104 can be brought to the two mass members which are perfectly separated. That is, the front cover (as the first mass member) 102 and the inner plate (as the second mass member) 104, which are united through the friction plate (as the coupling means) 110, are permitted to come away from each other by the hydraulic pressures P0 and P1 for engaging the clutch (or the clutch body) 108. As a result, the front cover 102 and the inner plate 104 are joined through the coiled spring (as the damper member) 106 only, so that a torque fluctuation on the engine side can be favorably absorbed.

Figure 2:
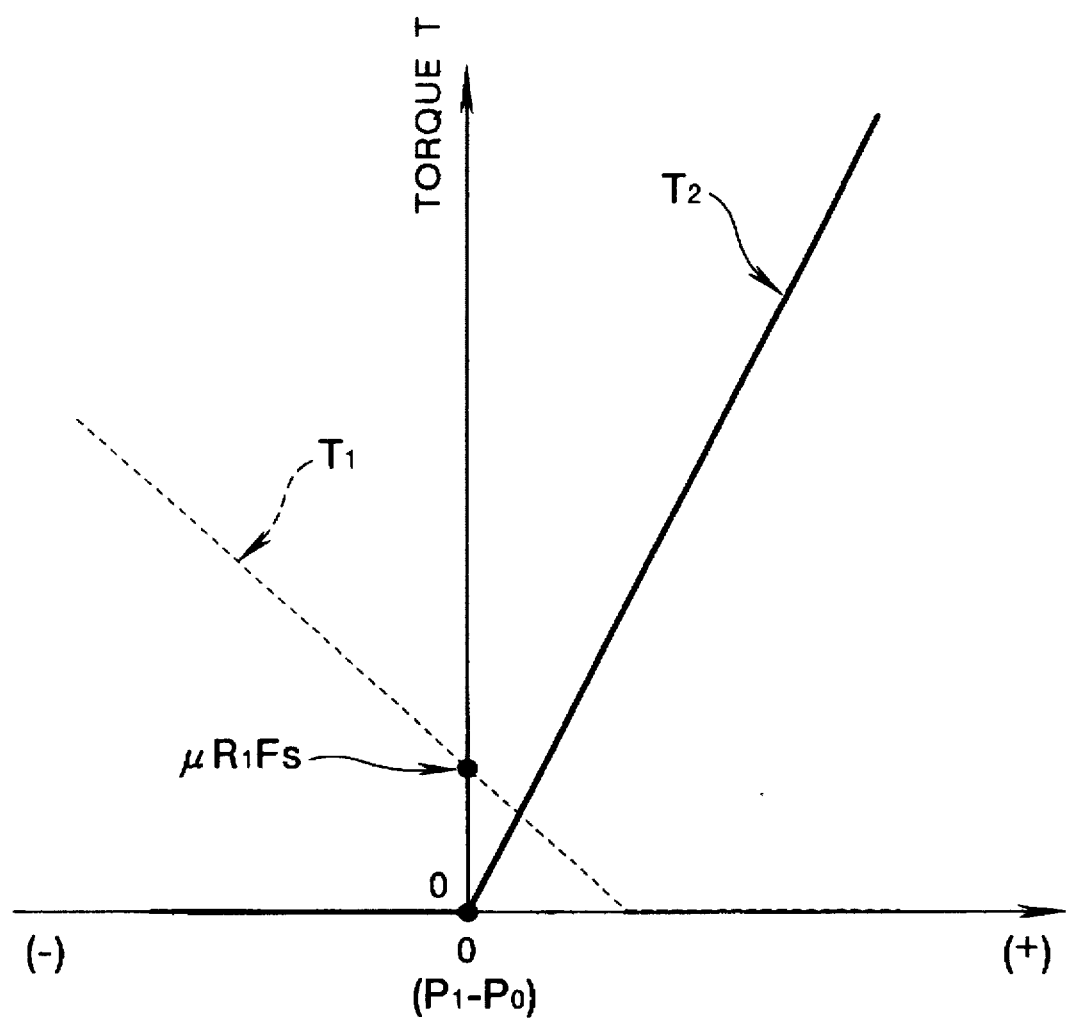
FIG. 2 is a graph showing the relationships between a differential pressure (P1–P0) and transmitted or delivered torques T1, T2.

FIG. 2 illustrates the relationships of the difference (P1–P0) of the hydraulic pressures P1 and P0 with a torque T1 transmitted on the friction plate (as the coupling means) 110, and with a torque T2 transmitted on the clutch (or the clutch body) 108. As seen from FIG. 2, the transmitted torque T2 of the clutch 108 rises since the differential pressure (P1–P0) turns to + (plus). On the other hand, the transmitted torque T1 of the friction plate 110 stuck on the inner plate 104 decreases with decrease in the absolute value of the minus value of the differential pressure (P1–P0). Incidentally, when the differential pressure (P1–P0) is zero, the transmitted torque T1 becomes $\mu.R1.Fs$. Here, symbol $\mu$ denotes the friction factor of the friction plate 110, and symbol R1 the effective mounting diameter of the same 110.

In this aspect of performance, both the switching solenoid 164 and the pressure regulating solenoid 174 are caused to function in ON-OFF fashion. As stated before, however, either of the switching solenoid 164 and the pressure regulating solenoid 174 can be replaced with the type capable of generating the hydraulic pressure P0 or P1 of any desired value. In this case, the hydraulic pressures P0 and P1 themselves and the differential pressure thereof can be set with the very high flexibility. It is therefore possible to freely execute controls of higher levels which include the slip control for the clutch 108, the coupling-degree control for the friction plate 110, etc.

Next, the second aspect of performance of the present invention will be described.

Figure 3:
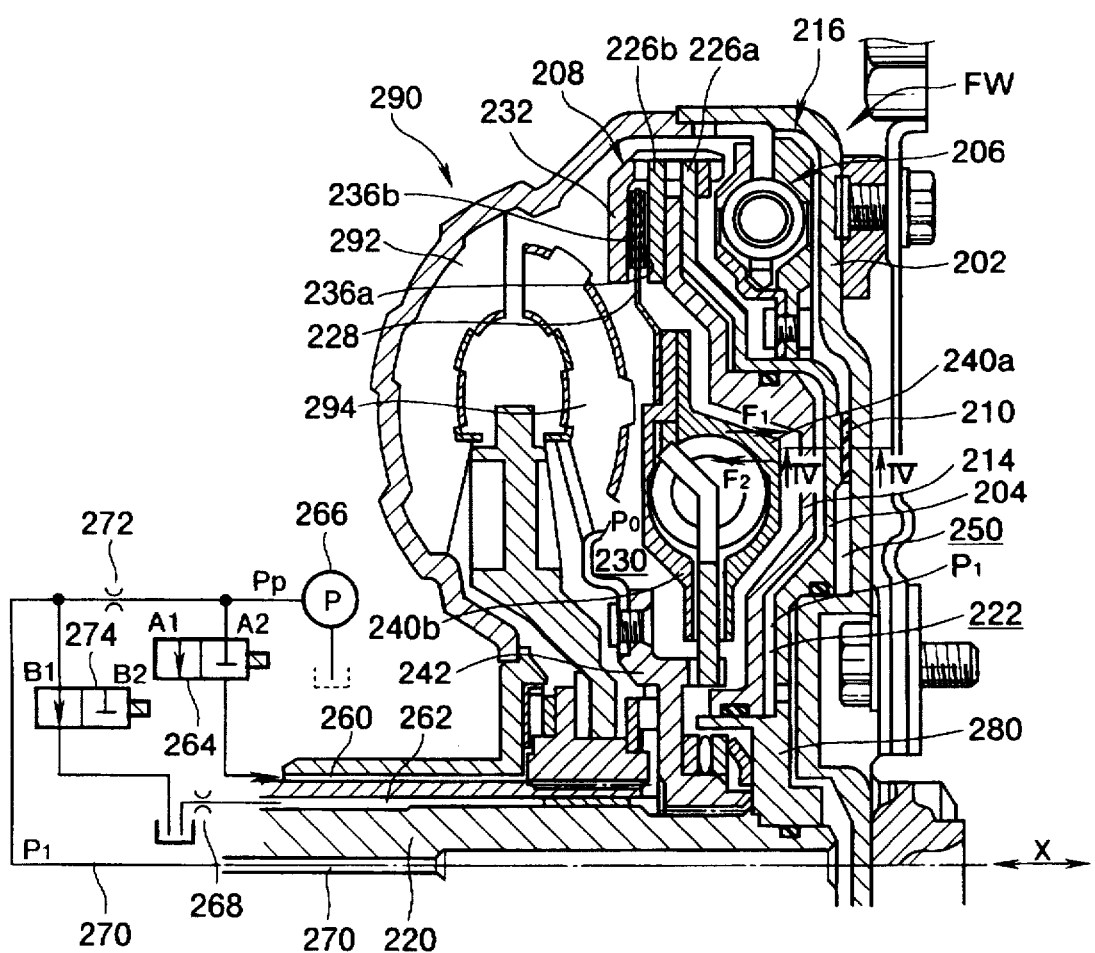
FIG. 3 is a vertical sectional view similar to FIG. 1, showing the upper half of a hydraulic clutch system with a flywheel in the second aspect of performance of the present invention.

FIG. 3 illustrates a hydraulic clutch system with a flywheel according to the second aspect of performance of the present invention. In the second aspect of performance, a fluid joint (as an auxiliary clutch body) 290 is assembled in parallel with a clutch (or a clutch body) 208. The fluid joint 290 makes it possible to transmit a predetermined magnitude of power, especially till the establishment of the state in which hydraulic pressures P0 and P1 can bring the clutch 208 into engagement.

The fluid joint 290 includes a pump 292 which is rotated unitarily with a front cover 202, and a turbine 294 which is rotated (through a fluid) by the rotation of the pump 292. The turbine 294 is joined with a hub 242 so as to be unitarily rotatable, so that the power can be transmitted to an output shaft 220 (as the input shaft of an automatic transmission) through the hub 242 quite in parallel with the clutch 208.

In this aspect of performance, the fluid joint (as the auxiliary clutch body) 290 is disposed in parallel with the clutch 208 as stated above. Therefore, in starting the engine of a motor vehicle, it is possible to effectively prevent the engine from abnormally raising its rotation, particularly in the state in which the clutch 208 cannot be engaged yet due to the delay of rise in the hydraulic pressure P1.

In addition, a belleville spring 280 is adopted here (instead of the coiled spring 180 shown in FIG. 1) as auxiliary coupling means for affording an urging force Fs all the time.

Figure 4A:
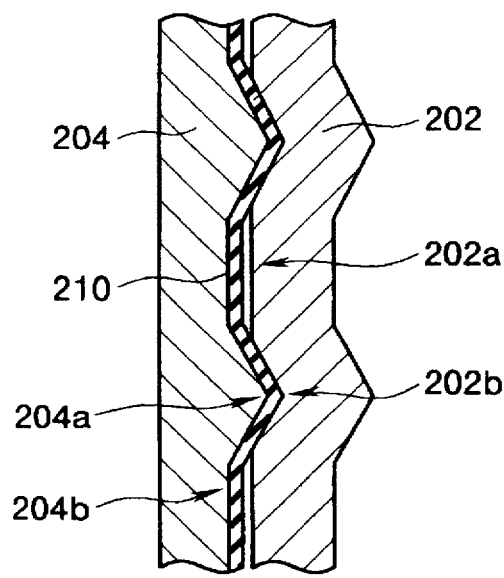
FIGS. 4A and 4B are partially-enlarged developed views of a circumferential section taken along line IV–IV indicated by arrows in FIG. 3, showing the construction of coupling means in the second aspect of performance.
Figure 4B:
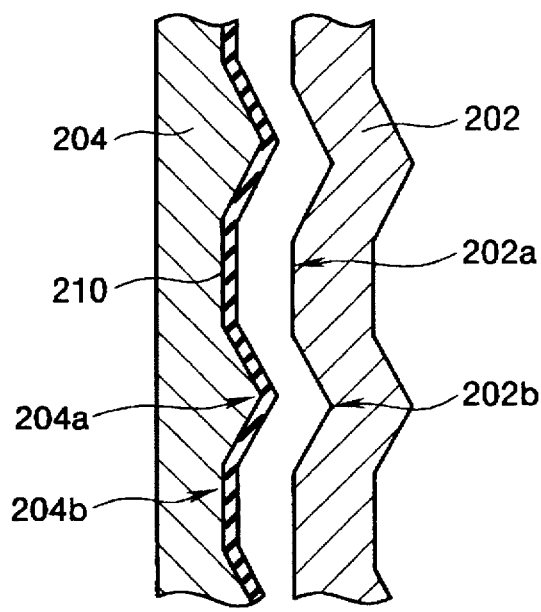

Meanwhile, FIGS. 4A and 4B are partially developed views each showing a circumferential section taken along line IV—IV indicated by arrows in FIG. 3.

FIG. 4A illustrates the state in which the front cover 202 and an inner plate 204 are coupled through a friction plate (as coupling means) 210, while FIG. 4B illustrates the state in which they are separated or decoupled. As seen from these figures, the front cover 202 and the inner plate 204 are formed with convexes (or crests) 202a and 204a and concaves (or troughs) 202b and 204b, so that they can mesh with each other.

Owing to such shapes, the front cover 202 and the inner plate 204 can be reliably united even in the state in which the mutual pressing forces of both the constituents 202 and 204 are not very strong, for example, the engine starting mode of the motor vehicle.

The shapes of the engagement or coupling faces of the constituents 202 and 204 are not restricted to the above, but other various ones can be considered. It is also allowed to form, for example, sinusoidal wave shapes or circular arc shapes. Besides, the frictional material 210 may well be omitted. It is to be noted, however, that the engagement faces should better be flat in the case where the coupling degree of the members to be engaged is intended to be controlled (for the slip control) more positively in accordance with the value of the hydraulic pressure P0 or P1 as in the foregoing first aspect of performance.

Since the remaining construction and operation of the second aspect of performance are similar to those of the preceding first aspect of performance, they shall be omitted from repeated description by merely assigning numerals each having the same two lower digits, to the identical or similar portions in FIG. 3.

Figure 5:
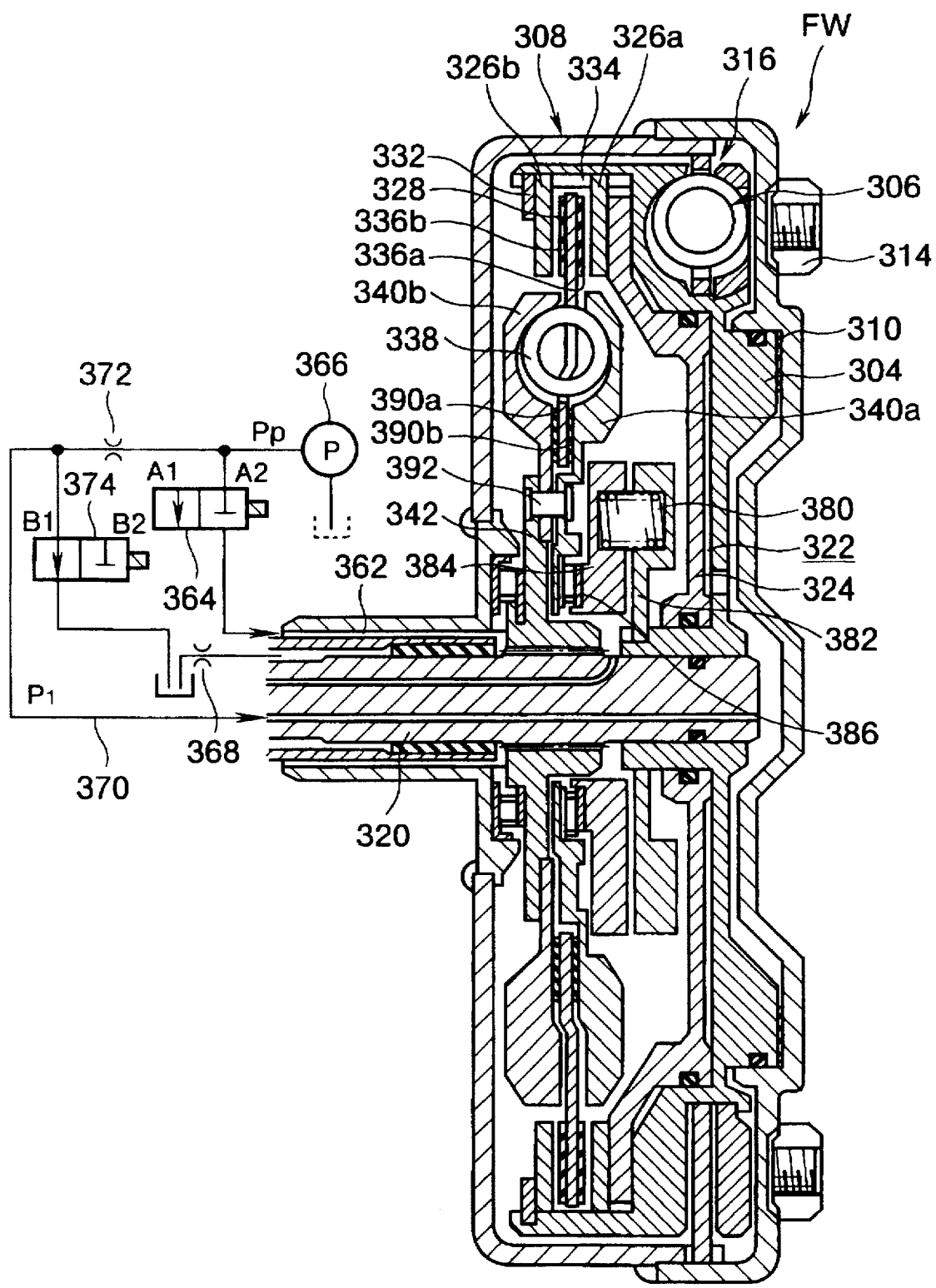
FIG. 5 is a vertical sectional view similar to FIG. 1, showing the third aspect of performance of the present invention.

FIG. 5 illustrates a hydraulic clutch system with a flywheel according to still another aspect of performance of the present invention.

In this aspect of performance, the hydraulic clutch system comprises friction plates (as friction means) 390a and 390b which generate frictional forces when a clutch 308 has been engaged, by utilizing the urging force of a coiled spring 380 (as auxiliary coupling means correspondent to the coiled spring 180) more positively.

More specifically, the disc 328 of the clutch 308 is extended between keep members 340a and 340b for a second coiled spring (as a second damper member) 338. Thus, the frictional forces can be generated through the friction plates 390a and 390b by the keep members 340a and 340b on the basis of the urging force of the coiled spring 380.

In order to secure this function, the keep members 340a and 340b are joined through a pin 392 so as to be movable in the axial direction of the hydraulic clutch system (they are fixed in the rotary direction of the system)

Owing to this function, when the clutch 308 is to be engaged, the second coiled spring 338 can be endowed with an appropriate degree of friction (or viscosity). It is accordingly possible to effectively suppress the vibrations of a motor vehicle attributed especially to a jerk at the rapid start thereof, etc.

As stated before, in the case where the spring constant K2 of the second coiled spring 338 is set greater than the spring constant K1 of a coiled spring 306, certainly the total quantity of energy to be stored in the second coiled spring 338 can be made small. Since, however, the stored energy is emitted in a short time due to the great spring constant K2, a (small) peak is liable to appear in the energy emission in case of releasing the clutch 308. In contrast, in the case where the friction plates 390a and 390b are disposed as in the third aspect of performance, the stored energy can be gradually emitted, and hence, the occurrence of a shock can be suppressed still further.

Incidentally, the construction of disposing the friction plates 390a and 390b is naturally applicable in the aspect of performance shown in FIG. 1 or FIG. 3.

Figure 6:
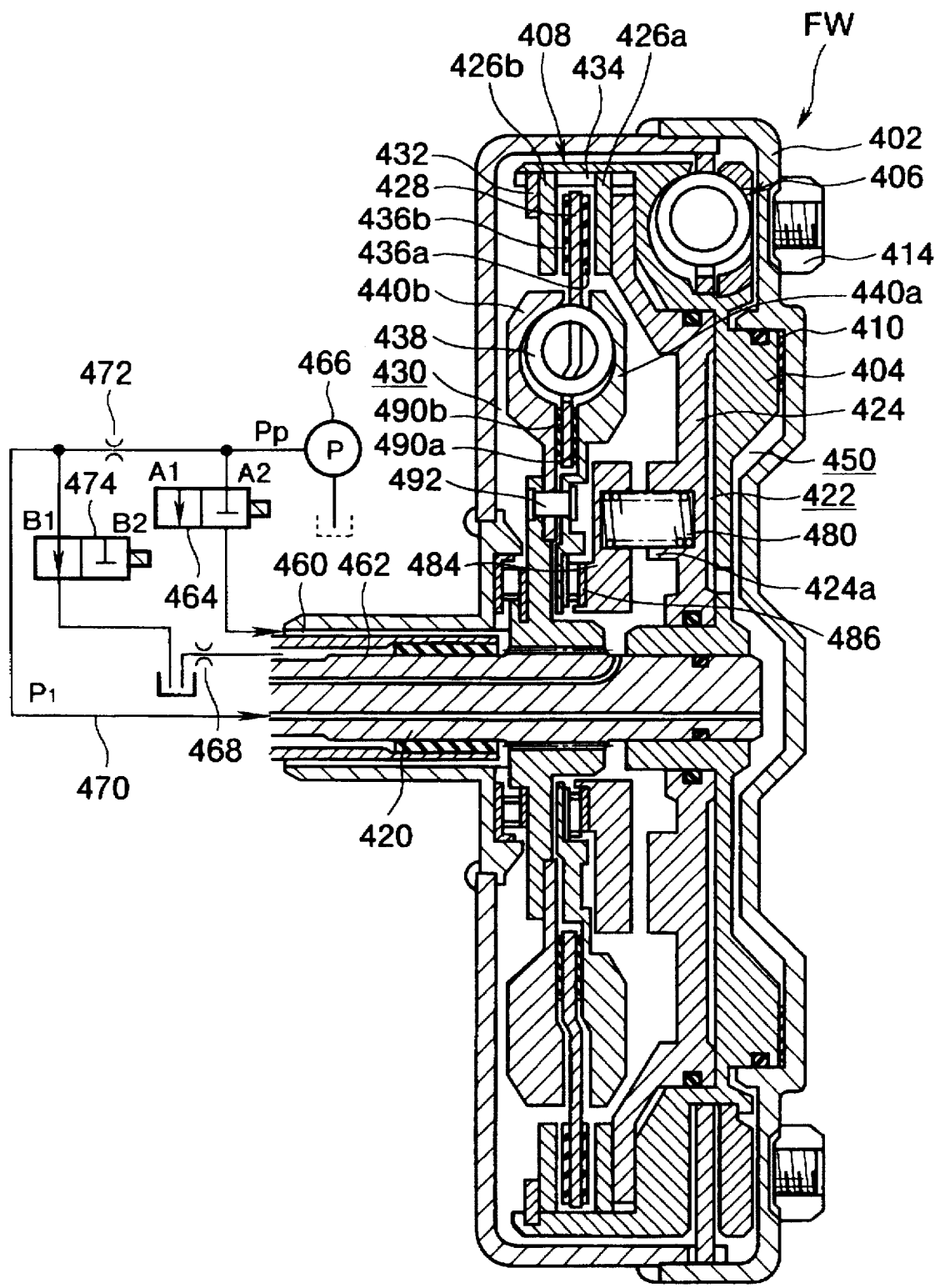
FIG. 6 is a vertical sectional view similar to FIG. 1, showing the fourth aspect of performance of the present invention.
Figure 7:
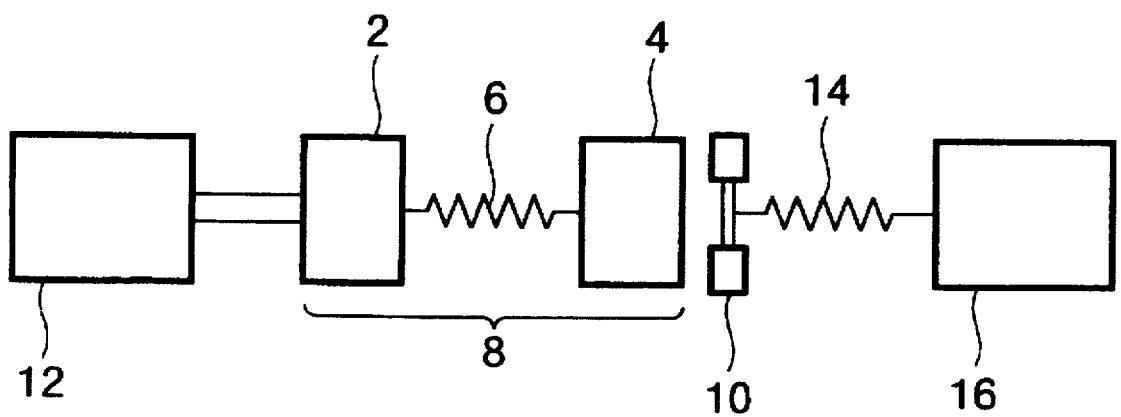
FIG. 7 is a general block diagram schematically showing a hydraulic clutch system with a flywheel in the prior art.

Besides, regarding the retention of the coiled spring 338, the first retention plate 182 (or 382) is fixed to the inner plate 104 (or 304) in the foregoing aspect of performance. As shown in FIG. 6 by way of example, however, a piston 424 may well be formed with a protrusion 424a, which is endowed with the function of the first retention plate. With this construction, a stronger urging force can be attained than in the foregoing aspect of performance, when the piston 424 has come to the left side as viewed in the figure, that is, when a clutch 408 lies in its engaged state.

Since the remaining constructions and operations of the third and fourth aspects of performance are similar to those of the embodiments already described, they shall be omitted from repeated description by merely assigning numerals each having the same two lower digits, to the identical or similar portions in FIG. 5 and FIG. 6, respectively.

As described above, according to the present invention, the coupling state between a first mass member and a second mass member can be controlled by hydraulic pressures for connecting and disconnecting a clutch body. This brings forth the excellent effect that the coupling between the first and second mass members can be controlled exactly (precisely) without additionally providing any large-sized and complicated control unit.

What is claimed is:

1. A hydraulic clutch system with a flywheel, wherein the flywheel includes a first mass member, a second mass member, and a damper member which is interposed between the first and second mass members, and wherein a clutch body is disposed so as to be hydraulically connectable with and disconnectable from the second mass member; the system comprising:

coupling means for uniting the first mass member and the second mass member by hydraulic pressures which function to connect and disconnect the clutch body.

2. A hydraulic clutch system with a flywheel as defined in claim 1, wherein the coupling means is furnished with auxiliary coupling means for generating a coupling force which prevents the first mass member and the second mass member from rotating relatively to each other, even in a state where said hydraulic pressures have not developed yet.

3. A hydraulic clutch system with a flywheel as defined in claim 2, further comprising friction means for generating a frictional force when said clutch body has been connected by the urging force of said auxiliary coupling means.

4. A hydraulic clutch system with a flywheel as defined in claim 2, wherein said auxiliary coupling means is retained by first and second retention plates, the first and second retention plates include engagement means adopted to engage each other, and said engagement means allow said first and second retention plates to move in an axial direction thereof and unite them in a rotary direction thereof.

5. A hydraulic clutch system with a flywheel as defined in claim 1, wherein said clutch body is furnished with an auxiliary clutch body which makes it possible to transmit a predetermined magnitude of power, until the hydraulic pressures can bring said clutch body into engagement.

6. A hydraulic clutch system with a flywheel as defined in claim 1, wherein a second damper member which is separate from the first-mentioned damper member is arranged on a driven side of said clutch body, and a spring constant of said second damper member is set greater than that of said first-mentioned damper member.

* * * * *

UNITED STATES PATENT AND TRADEMARK OFFICE
CERTIFICATE OF CORRECTION

PATENT NO.  : 5,695,032
DATED       : December 9, 1997
INVENTOR(S) : Kiyohito MURATA, et al.

It is certified that error appears in the above-identified patent and that said Letters Patent is hereby corrected as shown below:

On the title page, item [30] should be:

--[30]   Foreign Application Priority Data

Aug. 10, 1995   [JP]   Japan   ............   7-204659
Oct. 19, 1995   [JP]   Japan   ............   7-271586--

Signed and Sealed this

Twenty-fourth Day of February, 1998

Attest:

BRUCE LEHMAN

Attesting Officer         Commissioner of Patents and Trademarks